May 26, 1953  K. A. DOUTT  2,640,134
HYDRAULIC FLASH WELDER CONTROL
Filed Oct. 12, 1950  5 Sheets-Sheet 1

INVENTOR.
Kingsley A. Doutt.
BY
W. B. Harpman
ATTORNEY.

INVENTOR.
Kingsley A. Doutt.
BY
ATTORNEY.

May 26, 1953 K. A. DOUTT 2,640,134
HYDRAULIC FLASH WELDER CONTROL
Filed Oct. 12, 1950 5 Sheets-Sheet 3

INVENTOR.
Kingsley A. Doutt.
BY
ATTORNEY.

May 26, 1953
K. A. DOUTT
2,640,134
HYDRAULIC FLASH WELDER CONTROL
Filed Oct. 12, 1950
5 Sheets-Sheet 4
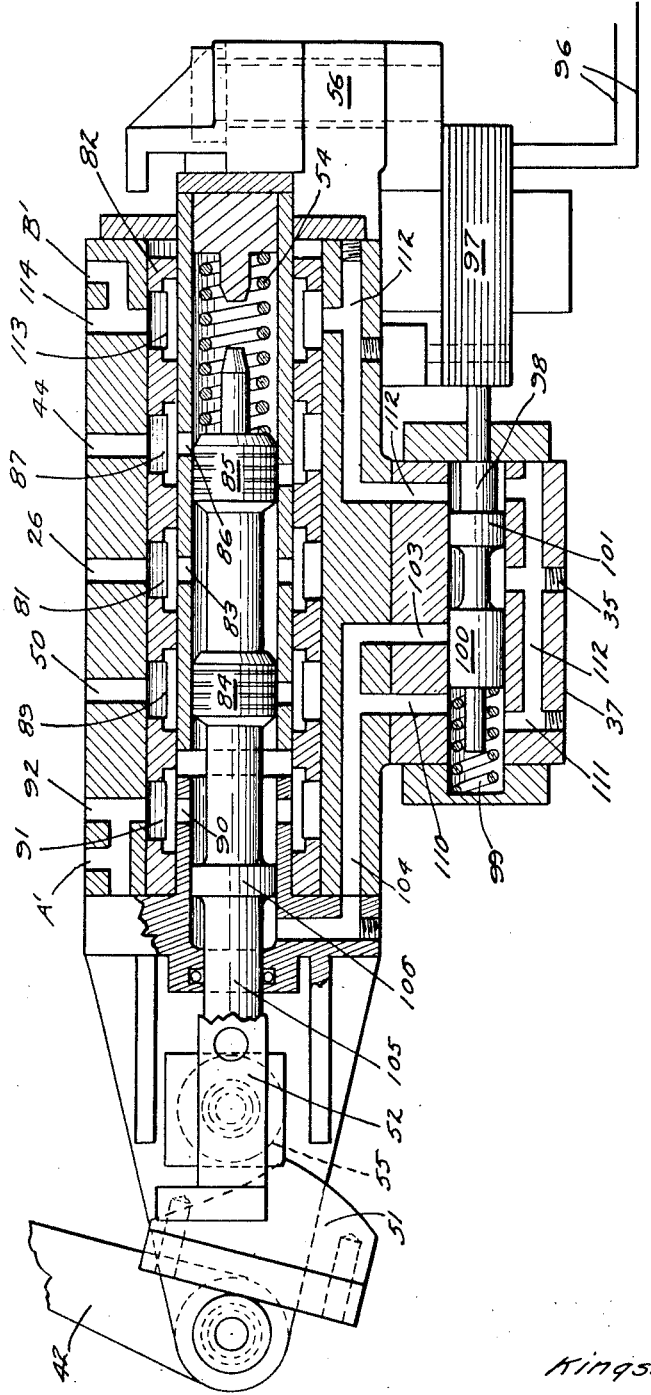
INVENTOR.
Kingsley A. Doutt.
BY W. B. Harpman
ATTORNEY.

May 26, 1953 K. A. DOUTT 2,640,134
HYDRAULIC FLASH WELDER CONTROL
Filed Oct. 12, 1950 5 Sheets-Sheet 5
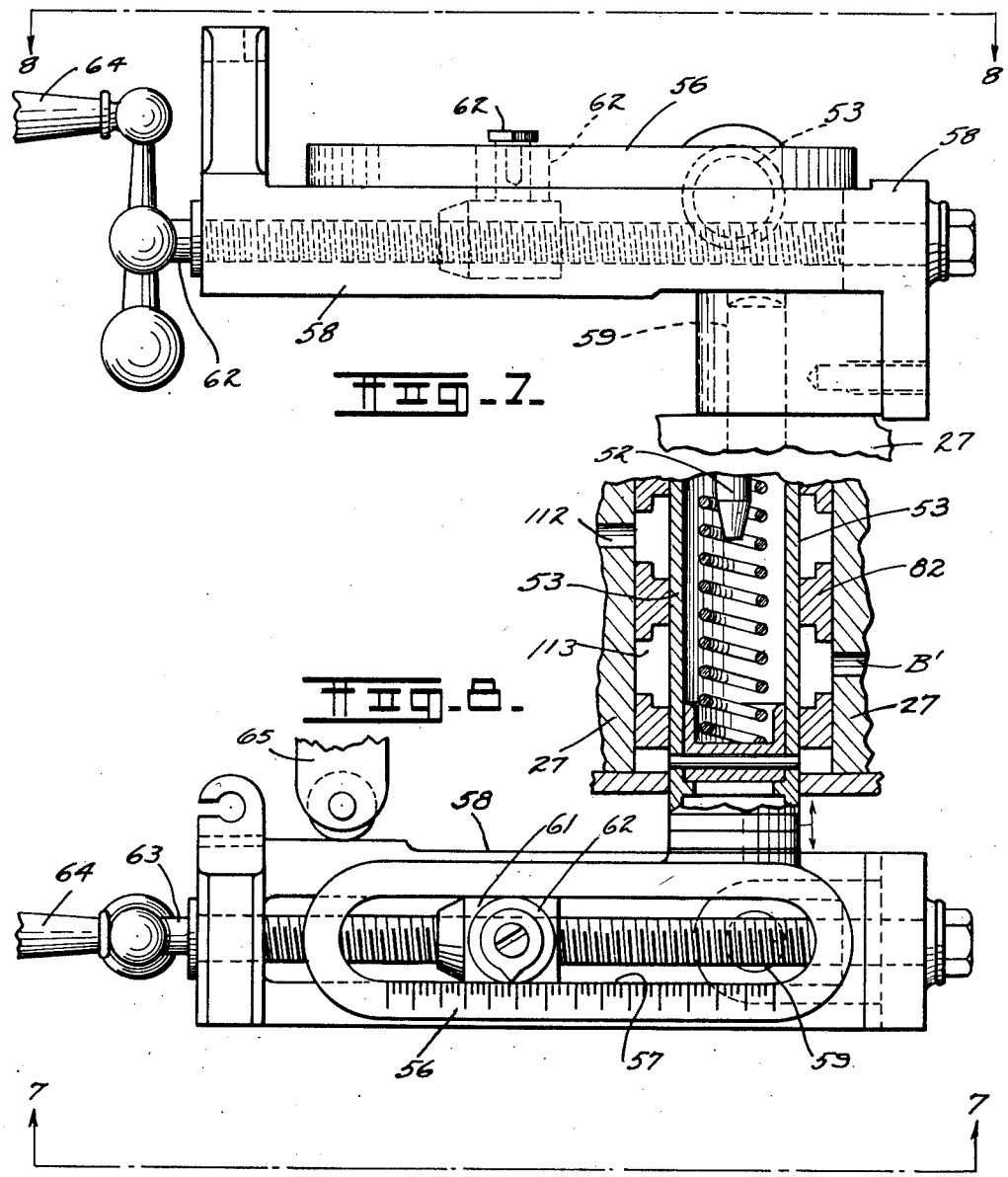
INVENTOR.
Kingsley A. Doutt
BY
ATTORNEY.

Patented May 26, 1953

2,640,134

UNITED STATES PATENT OFFICE 2,640,134

HYDRAULIC FLASH WELDER CONTROL

Kingsley A. Doutt, Detroit, Mich.

Application October 12, 1950, Serial No. 189,835

8 Claims. (Cl. 219—4)

This invention relates to electric welding apparatus and more particularly to an improved apparatus for imparting controlled movement to the movable platen of a flash welding machine.

Flash welding machines as known in the art comprise essentially an insulated normally fixed platen having an electrode and means to secure a workpiece thereto. A movable platen is also provided and includes an electrode and workpiece securing means. The movable platen is arranged for sliding movement toward and away from the fixed platen and means is provided for imparting such movement thereto. In the present disclosure at least one hydraulic cylinder and piston assembly is provided, the piston being connected to the movable platen.

In order that a controlled volume of hydraulic fluid may be supplied to the piston and cylinder assembly utilized, various types of valves and valve controlling means have been heretofore proposed and used. Such devices have generally had in common a mechanical connection with the movable platen of the flash welding machine so that the valves or other devices controlling and moving the movable platen were in turn controlled by the position of the movable platen itself and/or the speed of travel thereof. Those skilled in the art recognize that such dependency of the controlling elements of a flash welding machine is subject to variation depending upon the characteristics of the platen and workpiece, etc., to the end that an unequal and often undesirable action follows which results in an unsatisfactory weld.

Those skilled in the art are also aware that an improved welding technique will result from a desirably controlled and timed flash welding operation and it is, therefore, a principal object of this invention to provide a hydraulic flash welder control operating to impart a most desirable welding cycle movement and control to the movable platen of the flash welding machine regardless of variations in the hydraulic pressure utilized, conditions effecting the movable platen and variations in the workpieces as to size, thickness, material, shape, etc.

A further object of the invention is the provision of a hydraulic flash welding control for a flash welding machine arranged to perform a complete welding cycle from flashing to upsetting with no hesitation in the controlled and timed advance of the movable platen and operating in effect to superimpose upsetting action on a continuing flashing action.

Those skilled in the art will recognize that flash welder controls as heretofore known in the art had a common weakness in controlling the motion of the movable platen of the flash welding machine in the welding cycle, particularly in that hesitancy in the forward progressive motion of the movable platen frequently resulted in no weld or a poor weld due to instantaneous oxidation of various metals occurring at the time of hesitation or momentary interruption between the flashing and upsetting action in the flash welding machine. The present invention enables a continuous performance cycle and thereby eliminates completely the possibility of no welds or poor welds due to such oxidation.

A still further object of the invention is the provision of an improved apparatus for imparting controlled movement to the movable platen of a flash welding machine and which apparatus produces a flashing cycle in accordance with its preset controls and superimposes an upset cycle on the flashing cycle, the movement of the platen during the flashing cycle being responsive only to the apparatus and the upset cycle being responsive to the position of the platen and workpieces.

A still further object of the invention is the provision of a control system for a flash welder as above outlined which facilitates and simplifies the setting up of the welding machine to perform a particular welding operation and the apparatus therefore includes means for readily changing the pattern of movement of the platen during flashing and, in accordance with a preferred embodiment of the invention, the same is accomplished by employing a simple and positive valve actuated control of the apparatus incorporating relatively movable valve members enabling various desired settings to be readily achieved.

A still further object of the invention is the attainment of a wider diversity and greater accuracy in the control of the variables making up a flash welding operation. For example, the pattern of the rate of change of the movable platen during the flashing action may be readily varied with respect to time and the interval between the initiation of flashing and the start of the upsetting. Such variable factors enable a much higher degree of control over the welding operation to be achieved and thereby contribute substantially to the quality of the work performed.

A still further object of the invention is the provision of a hydraulic welder control which facilitates and simplifies the setting up of the welding machine to perform a particular welding operation especially when the operation is to be repeated under automatic control. The invention, therefore, includes means for readily changing the pattern of movement of the movable platen during the flashing and upsetting portions of the welding cycle, the device being so arranged that regardless of the adjustments made, a complete cycling of the flash welding machine always occurs.

A still further object of the invention is the provision of a hydraulic flash welding control mechanism enabling a flash welding operation to start instantaneously and particularly with respect to the immediate movement of the movable platen of the flash welding machine.

A still further object of the invention is the provision of a hydraulic flash welding control mechanism for a flash welding machine which will impart immediate and smooth action to the movable platen of the flash welding machine and continue such smooth progressive movement of the movable platen in accordance wtih a predetermined flashing and upsetting cycle whether or not the movable platen is dry or lubricated and regardless of the weight, shape, material or other characteristics of the workpiece to the end that a perfect flash weld is obtained.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 6 is an enlarged detailed elevation of a portion of the apparatus shown in Figure 1.

Figure 7 is an enlarged detailed elevation of a portion of the apparatus shown in Figure 2.

Figure 8 is an enlarged detailed view of the portion of the apparatus shown in Figure 7.

Figure 1:
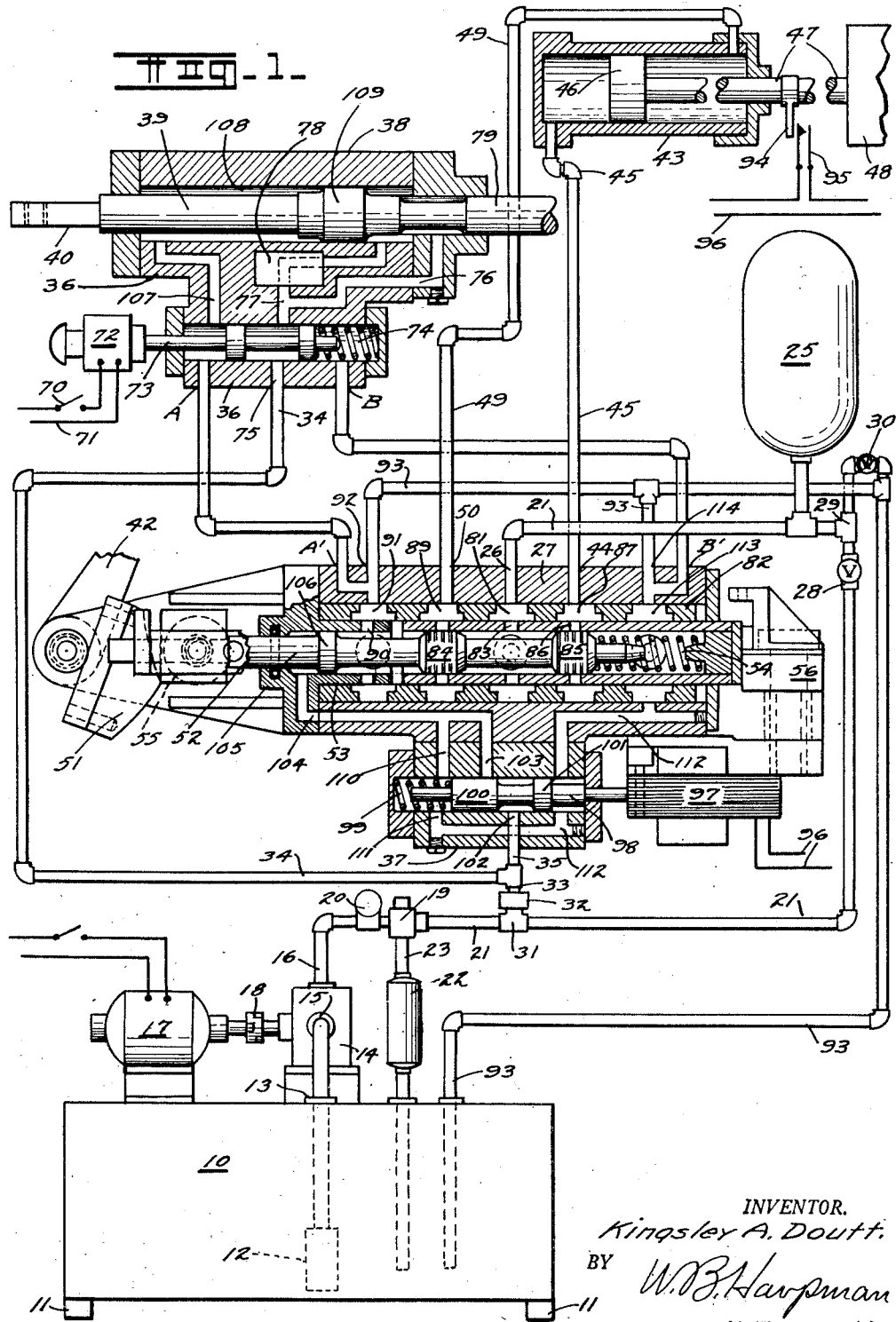
Figure 1 is a schematic diagram of the hydraulic flash welder control apparatus.

By referring to the drawings and Figure 1 in particular it will be seen that a hydraulic flash welder control is disclosed and that the same may be formed as a compact assembled unit including the control apparatus and the hydraulic fluid supply for the flash welding machine and that the complete hydraulic flash welder control can be connected with any flash welder to suitably operate the movable platen thereof to perform an improved flashing and upsetting welding cycle. Specifically, in Figure 1 of the drawings the numeral 10 indicates a tank which actually forms a supporting base for the remainder of the apparatus and provided with projecting feet 11—11 so that the same may be attached to a flash welding machine or positioned in proximity thereto. The tank 10 comprises a reservoir for the hydraulic fluid utilized and a filter 12 is disposed in the tank 10 and connected with the outlet orifice 13 thereof which in turn is in direct communication with a pump 14. The inlet orifice of the pump 14 is indicated by the numeral 15 and the outlet orifice is indicated by the numeral 16. The pump 14 is driven by an electric motor 17 which is connected to the pump 14 by means of a coupling 18. A relief valve 19 having a pressure gauge 20 receives the hydraulic fluid from the pump 14 as the same is in communication with the outlet orifice 16 of the pump 14.

A fluid supply line 21 connects with the relief valve 19 and with the controlling apparatus hereinafter described. The pressure relief valve is arranged so that at such time as the flash welding machine is inoperative, hydraulic fluid from the pump 14 is by-passed through an oil cooler 22 which is connected with the relief valve 19 by means of a tubular fitting 23 and with the tank 10 by means of a tubular fitting 24.

At such time as a flash welding machine controlled by the hydraulic flash welder control disclosed herein is in operation, as, for example, a flashing and upsetting cycle, hydraulic fluid flows from the relief valve 19 through the fluid supply line 21 directly to an accumulator 25 which is preferably of the air bladder type and to a high pressure inlet port 26 on a flashing and upset control valve 27. A check valve 28 is positioned in the fluid supply line 21 between the relief valve 19 and the accumulator 25 and permits fluid flow only toward the accumulator and the flashing and upset control valve 27.

Still referring to Figure 1 of the drawings it will be observed that the fluid supply line 21 includes a T 29, a portion of which communicates by way of a normally closed valve 30 with the tank 10 and which valve 30 is provided to permit the accumulator 25 to be drained. A second T 31 in the fluid supply line 21 connects with a pressure reducing valve 32. A supply line 33 conveys hydraulic fluid at reduced pressure from the pressure reducing valve 32 to two low pressure supply lines 34 and 35 communicating respectively with a sequence starting valve 36 positioned above the flashing and upset control valve 27 and with an upset pilot valve 37 which is disposed beneath the flashing and upset control valve 27.

Figure 2:
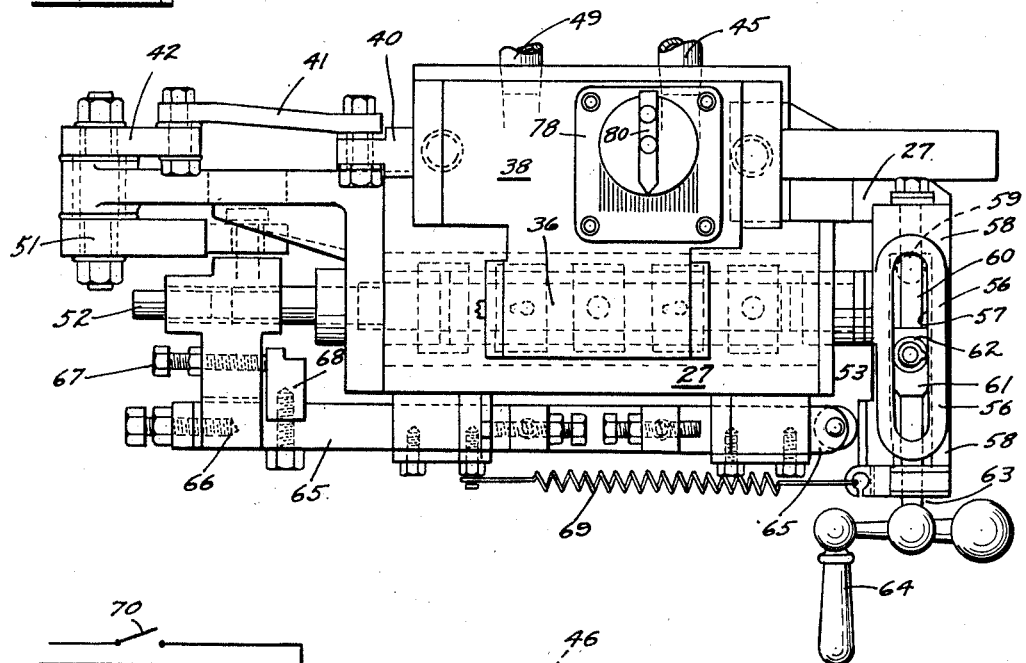
Figure 2 is a top plan view of a portion of the apparatus shown in Figure 1.
Figure 3:
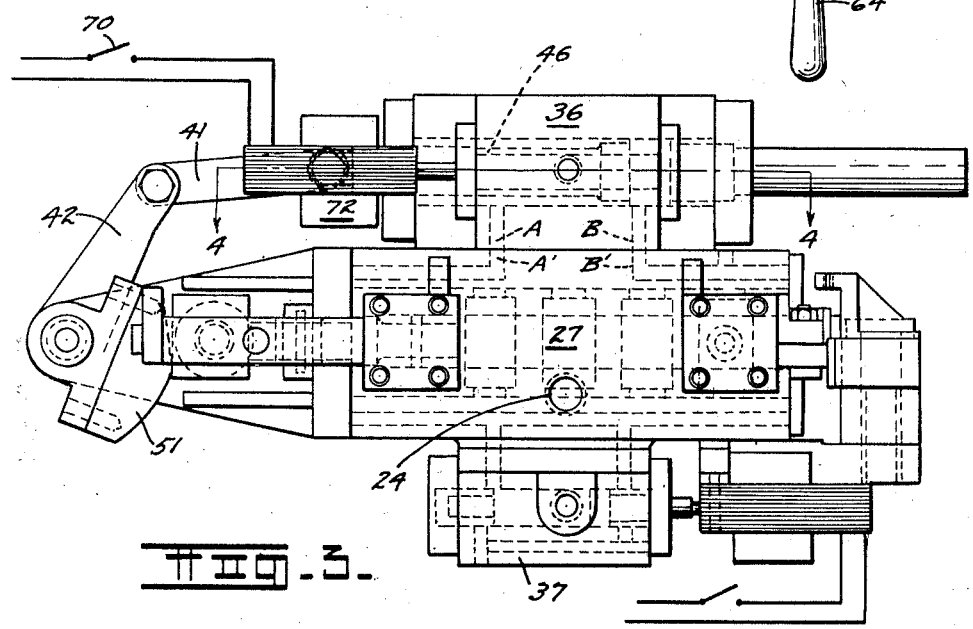
Figure 3 is a side elevation of the portion of the apparatus shown in Figure 2.
Figure 4:
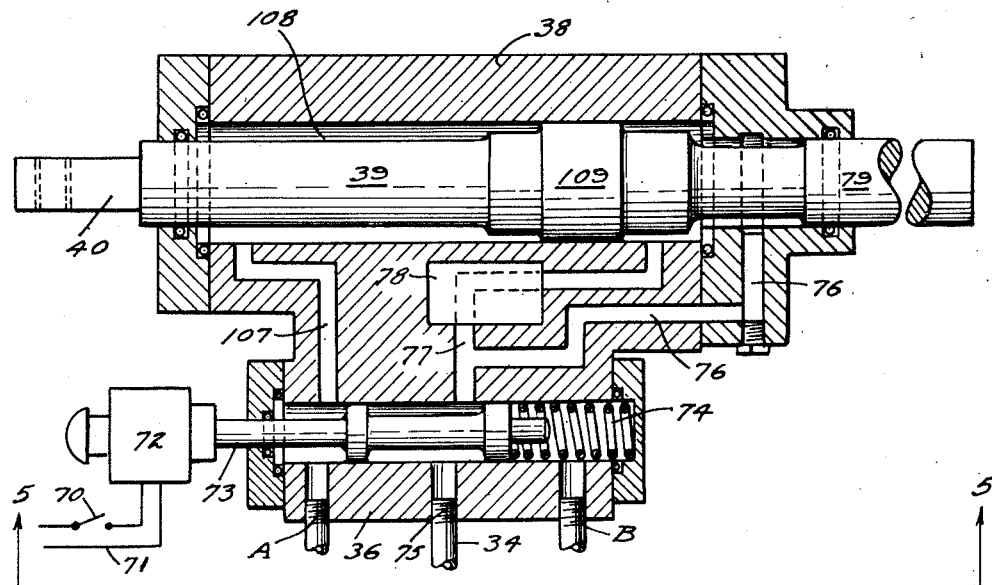
Figure 4 is a horizontal section taken on line 4—4 of Figure 3.
Figure 5:
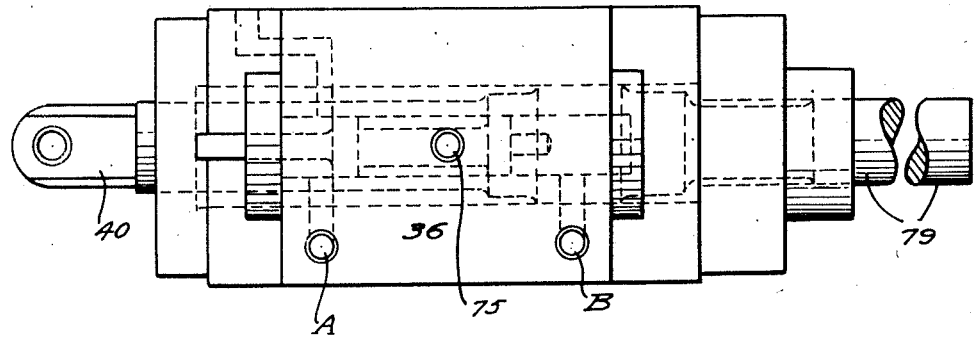
Figure 5 is a side elevation of the portion of the apparatus shown in Figure 4 and taken on line 5—5 thereof.

Positioned adjacent the sequence starting valve 36 there is a flash control valve 38 including a reciprocally positioned piston 39, an end 40 of which extends outwardly of the ends of the flash control valve 38 and the left hand end of which (as best illustrated in Figures 2 and 3 of the drawings) is pivotally connected to a link 41 which in turn is pivotally connected to a cam arm 42. The sequence starting valve 36 and the flash control valve 38 are integrally formed and shown in enlarged horizontal section in Figure 4 of the drawings and in side elevation in Figure 5 of the drawings. It will be observed that ports A and B in the sequence starting valve are in communication with ports A' and B' in the flashing and upset control valve 27 which is shown in vertical section in Figures 1 and 3 of the drawings and in communication with the upset pilot valve 37 which is directly connected thereto.

It will thus be seen that fluid pressure from the pump 14 and the accumulator 25 flows by way of the fluid supply line 21 directly to the inlet port 26 in the flashing and upset control valve 27 where it is controlled with respect to communication with a hydraulic cylinder 43. An outlet port 44 in the flashing and upset control valve 27 is connected by means of a fluid supply line 45 with the closed end of the hydraulic cylinder 43. A piston 46 is positioned within the cylinder 43 and a connecting rod 47 extends outwardly through the opposite end of the cylinder 43 and connects with a movable platen 48 of the welding apparatus. A return fluid line 49 establishes communication with the rod end of the cylinder 43 and with a port 50 in the flashing and upset control valve 27.

In Figures 2 and 3 of the drawings the cam arm 42 is shown connected with a cam 51 so that movement imparted to the cam arm 42 through the link 41 by the piston 40 in the flash control valve and piston 38 may be imparted to a spool 52 forming the multiple valve element in the flashing and upset control valve 27, as best illustrated in Figures 1 and 6 of the drawings.

Still referring to Figures 1 and 6 of the drawings it will be seen that the spool 52 is reciprocally positioned in a sleeve 53 which in turn is reciprocally positioned in the body of the flashing and upset control valve 27. A plurality of slot-like ports are formed in the sleeve 53 for registry with a plurality of ports in the body of the valve 27 and more particularly with a hardened tubular insert positioned therein and defining the actual orifices, as hereinafter described. The spool 52 is spring urged toward the left as shown in Figures 1 and 8 of the drawings by a coil spring 54 positioned in the right hand end of the sleeve 53 and the outermost left hand end of the spool 52 is provided with a rotor 55 engaging the cam 51. The right hand end of the sleeve 53, as shown in Figures 8, 2, 6 and 7 is connected with a bracket 56 which has a transversely extending slot 57.

A secondary bracket 58 is pivoted to the body of the flashing and upset control valve 27 by a pivot 59 and is normally disposed adjacent the bracket 56 and is provided with a transverse slot 60 in which a block 61 is slidably positioned. A roller 62 is pivotally mounted on the block 61 and is engaged in the slot 57 in the bracket 56. A threaded rod 63 is journaled at its ends in the bracket 58 and is provided with a crank 64 on one end. The threaded rod 63 passes through an internally threaded opening in the block 61 so that rotary motion imparted to the crank 64 results in travel of the block 61 and roller 62 longitudinally of the slots 57 and 60.

A follow bar 65 which moves the secondary bracket 58 is slidably disposed beneath the body of the flashing and upset control valve 27 and is adapted to be engaged by a depending bracket 66 attached to one end of the spool 52 which is moved by the cam 51. This is best illustrated in Figures 2 and 6 of the drawings. A screw 67 positioned through the depending bracket 66 is adapted to engage an abutment 68 on the follow bar 65 in an adjustable manner, the adjustment determining when relative motion between the spool 52 and the sleeve 53 starts. The secondary bracket 58 is normally urged toward the follow bar 65 by a coil spring 69 which is connected thereto and to one of the supports carrying the follow bar 65.

It will thus be seen that the bracket 56 on the sleeve 53 and the secondary bracket 58 positioned adjacent thereto are interconnected between the block 61 and the roller 62 to form a flashing curve control as the block 61 and the roller 62 comprise, in effect, a movable fulcrum for varying the relative motion of the sleeve 53 with respect to the motion of the spool 52. It will be seen that at such time as the roller 62 is moved to a point adjacent the pivot 59, the maximum motion of the spool 52 will be imparted by the follow bar 65 to the bracket 58 but that very little, if any, motion will be imparted to the bracket 56 by the interconnecting roller 62. On the contrary, at such time as the roller 62 is located in the slot 57 in spaced relation to the pivot 59, relatively greater motion will be imparted to the sleeve 53 thereby providing desirable variation in the flashing curve of the welder controlled by the apparatus.

By referring now to Figure 1 of the drawings it will be seen that a composite view of the flash welding control apparatus is disclosed complete with interconnecting piping. The view includes a horizontal section through the flash control valve 38 and the appended sequence starting valve 36 and a vertical section through the flashing and upset control valve 27 and its appended upset pilot valve 37.

It is believed that from the foregoing one skilled in the art will observe that the flash welding control apparatus comprises essentially the flashing and upset control valve 27 which directly controls the hydraulic fluid delivered by the pump 14 and the accumulator 25 to the platen moving piston and cylinder 46 and 43, respectively, the action of the flashing and upset control valve 27 being responsive to the operation of the piston 40 in the flash control valve 38, which is in turn responsive to the sequence starting valve 36 as hereinafter described. The movement of the piston 40 in the flash control valve 38 imparts predetermined movement to the cam 51 and hence the spool 52 of the flashing and upset control valve 27. Simultaneously with such movement of the spool 52, the motion of the cam 51 is imparted to the follow bar 65 and imparted thereby to the secondary lever 58 as heretofore described.

Assuming that the workpieces to be welded (not shown) have been secured in the stationary and movable platens of the flash welder control by the device and that the pump 14 is being operated by the motor 17 and hydraulic fluid is therefore being supplied the fluid supply lines 21, 33, 34 and 35, the operating cycle of the flash welding machine is initiated by the manual or automatic closing of a switch 70. Closing the switch 70 closes the circuit in conductors 71 and energizes a solenoid 72 which moves a piston valve 73 in the sequence starting valve 36.

The piston valve 73 in the sequence starting valve 36 is normally biased to closed position by a coil spring 74 located adjacent one end of the piston valve 73. Motion of the solenoid 72 moves the piston valve 73 to the right, compresses the spring 74 and opens a fluid passageway from an inlet port 75 which is in communication with the hydraulic fluid supply line 34 and establishes communication with a pair of channels 76 and 77. The channel 76 comprises a by-pass channel and the channel 77 is under the control of a variable flow control valve 78.

The channels 76 and 77 communicate with the right hand portion of the flash control valve 38, and responsive to the introduction of hydraulic fluid thereinto, the piston 40 in the flash control valve 38 will move to the left rapidly. The left end of the piston 40 is connected by means of the link 41 with the cam arm 42 heretofore referred to and the cam 51 is thus moved rapidly responsive to the rapid motion of the piston 40. Movement of the piston 40 causes an enlarged portion 79 thereof to close the channel 76, thus placing the flow control valve 78 in control of the amount of fluid delivered to the flash control valve 38 and hence controls the rate of travel of the piston 40 and hence the movement of the cam 51.

The flow control valve 78 is a metering valve and, as may be seen by referring to Figure 2 of the drawings, is provided with a manually adjustable control lever 80 by means of which the metering action of the flow control valve 78 may be controlled and preset. It will thus be seen that the sole function of the flash control valve 38 and its appended sequence starting valve 36 is to impart controlled mechanical motion to the cam 51 which in turn moves the spool 52 and sleeve 53 of the flashing and upset control valve 27. The flashing and upset control valve 27 and its appended upset pilot valve 37 control the actual hydraulic fluid delivered to the cylinder 43 for actuating the piston 46 which is connected with the movable platen 48 of the flash welder as heretofore described.

Still referring to Figure 1 of the drawings it will be seen that the fluid supply line 21 conveys hydraulic fluid to the inlet port 26 of the flashing and upset control valve 27 which communicates with an annular chamber 81 formed about the sleeve 53 by a cylindrical body member 82 which has spaced annular channels formed on its innermost surface and apertures communicating with said channels.

Hydraulic fluid introduced into the channel 81 (which comprises one of the annular channels in the cylindrical body member 82) thereby completely encircles the sleeve 53 and one or more apertures 83 in the sleeve are provided to convey the hydraulic fluid to the chamber within the sleeve and between a pair of spaced tapered heads 84 and 85 on the spool 52. As the spool 52 is moved to the right by the cam 51, as heretofore described, the head 85 will expose one or more orifices 86 in the sleeve 53. The orifices 86 establish communication with an annular channel 87 in the cylindrical body member 82. The annular channel 87 is in communication with the outlet port 44 of the flashing and upset control valve 27. The fluid supply line 45 connects the outlet 44 with the closed end of the cylinder 43 so that hydraulic fluid is delivered to the cylinder 43 and moves the piston 46 and hence the movable platen 48 of the flash welding apparatus.

It will be observed that the head 85 on the spool 52 is provided with oppositely disposed tapers at different angles on its opposite sides so that a metering action is had with respect to the delivery of hydraulic fluid to the aperture 86 with the result that the movement imparted to the movable platen 48 is always smooth. It will also be seen that the position of the sleeve 53 meters the fluid delivered to the cylinder 43, and, as the positions of the spool 52 and sleeve 53 are changing responsive to the flashing curve control of the block 61 and roller 62, a progressive flashing action results as the volume of fluid delivered to the cylinder 43 progressively increases.

Simultaneouly with the delivery of hydraulic fluid to the cylinder 43 and the movement of the platen 48 by the piston 46, as just described, the head 84 on the spool 52 moves to open an aperture 88 in the sleeve 53 which communicates with an annular chamber 89 in the cylindrical body member 82. The annular chamber 89 communicates with the inlet port 50 and the return fluid line 49 establishes communication between the inlet port 50 and the opposite end of the cylinder 43 so that hydraulic fluid therein and being discharged therefrom through the return fluid line 49 is gradually admitted to the chamber within the sleeve 53 and to the left of the head 84 by the metering action of the tapered head 84. The hydraulic fluid thus admitted flows through one or more apertures 90 in the sleeve 53 into an annular chamber 91 formed in the cylindrical body member 82 which communicates with an outlet port 92. A return line 93 establishes communication between the outlet port 92 and the tank 10 so that the hydraulic fluid is thus delivered thereto.

Still referring to Figure 1 of the drawings it will be observed that the piston 46 and the movable platen 48 will move to the right responsive to the admission of hydraulic fluid to the cylinder 43 under the predetermined control of the flashing and upset control valve 27, it being observed that the relative movement of the spool 52 carrying the heads 84 and 85 with respect to the sleeve 53 is controlled by the flashing curve control apparatus heretofore disclosed and described in connection with Figures 2 and 3 of the drawings whereby a desirable flashing curve or progressive motion of the movable platen 48 is achieved. The connecting rod 47 through which motion is imparted to the movable platen 48 is provided with a cam 94 which engages a switch 95 controlling a circuit 96. The circuit 96 is also connected with an upset solenoid 97 which is adapted to engage and move a piston valve 98 in the upset pilot valve 37 which is appended to the flashing and upset control valve 27.

Still referring to Figure 1 of the drawings the construction and operation of the upset pilot valve 37 may be seen. The solenoid 97 is directly connected with the piston valve 98 in the upset pilot valve 37. The piston valve 98 is normally biased to the right by a coil spring 99 in which position heads 100 and 101 block an inlet orifice 102 which is in communication with the fluid supply line 35, heretofore referred to, and hence with a source of hydraulic fluid from the pump 14. Operation of the solenoid 97 moves the piston valve 98 to the left and establishes communication between an inlet port 102 and an outlet port 103 which communicates with a channel 104 in the flashing and upset control valve 27 and whereby hydraulic fluid is delivered to a chamber 105 in the flashing and upset control valve 27 adjacent a head 106 on the spool 52 so that the hydraulic fluid immediately moves the spool 52 and the sleeve 53 to the right accelerating the motion heretofore imparted thereto by the cam 51 (as heretofore described) and immediately fully opens the flashing and upset ports 86, 87 and 44 whereby a large volume of hydraulic fluid is delivered to the line 45 and the cylinder 43 which results in an immediate upsetting motion imparted to the platen 48 by the piston 46 responsive to the fluid action. Simultaneously with such action, the head 84 on the spool 52 is moved into fully open position with respect to the return line 49 and the inlet ports 50, 89 and 88 so that hydraulic fluid on the opposite side of the piston 46 can be immediately delivered to the return line 93 and the supply tank 10.

It will occur to those skilled in the art that automatic timing devices can be incorporated in the controlling circuits heretofore mentioned so that the period of energization of the solenoids 72 and 97, respectively, can be predetermined. At such time as the upset solenoid 97 is energized, the solenoid 72 controlling the sequence starting valve 36 is de-energized permitting the spring 74 to return the piston valve 73 therein to normal position at the left hand end of the sequence starting valve 36 and opening a communication line between the inlet port 75 and a fluid channel 107 which communicates with a chamber 108 in the flash control valve 38 and hydraulic fluid is thereby delivered to the left hand side of a head 109 on the piston 40 so as to move the same to the right thereby resetting the cam 51 for a subsequent welding operation.

After a suitable time interval, the solenoid 97 controlling the upset pilot valve 37 is de-energized and the spring 99 returns the valve piston 98 therein to normal position at the right hand end of the upset pilot valve 37 which closes communication between the inlet 102 and the outlet 103 thereof. Simultaneously, by-pass ports 110 and 111 are placed in communication with a fluid channel 112 in the upset pilot valve 37. The fluid channel 112 communicates with an annular chamber 113 in the flashing and upset control valve 27 which in turn communicates by way of a port 114 with a portion of the return line 93. It will thus be seen that hydraulic fluid in the chamber 105 is able to flow through the channels 104 and 112 and the annular chamber 113 to the return line 93 and back to the tank 10. The spring 54 moves the spool 52 to the left to reset the valve for a subsequent welding operation and such action establishes communication between the inlet port 26 in the valve 27 with the annular chamber 81 about the cylindrical body member 82 and by way of the orifices 83 and 88 with the annular chamber 89 and the outlet port 50 so that hydraulic fluid then flows through the line 49 to the rod end of the cylinder 43 and thereby moves the piston 46 to the left to return the platen 48 to starting position for a subsequent welding operation. It will thus be seen that the flashing and upset cycle is completed automatically once the switch 70 is closed energizing the solenoid 72 which controls the sequence starting valve 36.

It will thus be seen that in a complete flashing and upset welding cycle flashing starts when the piston 40 moves to the left and moves the cam 51 through its interconnecting linkage which directly moves the spool 52 to the right and shortly thereafter imparts a relatively lesser degree of motion to the sleeve 53 by way of the follow bar 65 and the flashing curve control mechanism including the block 61 and roller 62 establishing variable fulcrum means between the follow bar 65 and the sleeve 53 with the result that the sleeve 53 moves to slowly open the orifices therein while the spool 52 opens the communication channels between the inlet port 26 and the orifices with the result that the movable platen 48 moves in the flashing portion of the welding cycle.

It will occur to those skilled in the art that the speed of the movable platen 48 increases in accordance with the presetting of the flashing curve control 64, as heretofore described in connection with the block 61 and roller 62, so that a desirable completely variable flashing curve is achieved. It will also be noted that the action of the piston 40 in moving the cam 51 is initially rapid to eliminate delay in the start of the flashing cycle and subsequently is controlled by the flow control valve 78 which is also variable. As the relative motion between the spool 52 and the sleeve 53 progresses, the motion of the platen 48 increases as desired in the flashing cycle.

At such time as the cam 94 on the connecting rod 47 through which the movable platen 48 is moved reaches a predetermined upsetting point, the upsetting action is superimposed on the flashing action with no hesitancy. This occurs by the energization of the solenoid 97 and its operation of the upset pilot valve 37 which immediately delivers fluid pressure to the chamber 105 in the valve 27 and instantly moves the spool 52 and sleeve 53 to the right to fully open the flashing orifices in the sleeve with respect to the annular chambers in the cylindrical body member 82 and simultaneously moves the spool 52 to completely open the flashing ports. Full hydraulic pressure is thus instantly delivered to the cylinder 43 which results in the immediate upsetting action imparted the movable platen 48.

It will be obvious to those skilled in the art that a time delay mechanism may be incorporated if desired to control the length of time of the upset cycle. Alternately, the switch 95 may be manually opened to permit the upset solenoid 97 to be de-energized. At such time as the upset solenoid 97 is energized, the starting sequence solenoid 72 is de-energized either automatically or manually which thereby permits fluid pressure to reset the piston 40 and the cam 51. Following the conclusion of the upset cycle, the de-energization of the upset solenoid 97 will permit the upset pilot valve 37 to reset and drain fluid from the valve 27 and thereby permit the spring 54 in the same to reset the spool 52 therein. Simultaneously, the spring 69 on the exterior of the device will reset the sleeve 53 and the complete apparatus is then ready for a subsequent welding operation.

It will thus occur to those skilled in the art that the complete flashing and upsetting cycle provided by the control apparatus occurs by reason of the relative movement of the spool 52 and the sleeve 53 in the valve 27 and that this relative movement is capable of being varied by the flashing curve control mechanism including the block 61 and roller 62 and the setting of the flow control valve 78. The only interconnection between the movable platen 48 and the apparatus is the cam 94 and the switch 95 controlling the upset solenoid 97. The time of operation of the switch 95 is dependent on the prior operation of the apparatus which is imparting controlled flashing cycle motion to the connecting rod 47 which carries the cam 94.

It will thus be seen that the several objects of the invention are met by the hydraulic flash welder control disclosed herein.

Having thus described my invention, what I claim is:

1. Hydraulic control apparatus for a flash welder having a normally fixed platen and a movable platen operated by a fluid pressure motor, said apparatus acting to control the movement of the movable platen during a welding cycle and comprising in combination a source of hydraulic fluid under pressure, a valve for controlling the flow of fluid from said source to said motor, said valve having two relatively movable valve elements, a secondary fluid pressure operated motor, variable motion transmitting mechanism interconnecting said secondary fluid pressure operated motor and said valve elements to move said valve elements relatively in such manner that the movement of the platen will follow a predetermined position-speed relationship during the flashing period of said cycle.

2. Apparatus according to claim 1 and further including a secondary metering valve controlling said secondary fluid pressure operated motor.

3. Apparatus according to claim 1 and further including a secondary metering valve controlling said secondary fluid pressure operated motor and a by-pass about said secondary metering valve positioned for communication with the said secondary fluid motor only during its initial movement.

4. Apparatus in accordance with claim 1 and wherein the variable motion transmitting means interconnecting the secondary fluid pressure operated motor and the valve elements includes a mechanical interconnection between the said fluid pressure operated motor and one of the said valve elements, the said mechanical interconnection including a fixed pivot and a secondary pivot movable toward and away from said fixed pivot to form a variable fulcrum with respect to the mechanical interconnection and the said valve element.

5. In a hydraulic control for a flash welder having a normally fixed platen and a movable platen, means to control the movement of the movable platen during the welding cycle comprising in combination a source of hydraulic fluid under pressure, a fluid pressure operated motor for moving said movable platen, valve means for controlling the flow of fluid from said source to said motor, said valve means having two relatively movable valve elements, a secondary fluid pressure operated motor, a solenoid valve in communication with said source of hydraulic fluid, said secondary fluid pressure operated motor responsive in operation to opening of said solenoid valve, variable motion transmitting means interconnecting said secondary fluid pressure operated motor and said valve elements to move the said valve elements in such manner that the movement of the platen will follow a predetermined position-speed relationship during the flashing period of said cycle.

6. In a hydraulic control for a flash welder having a normally fixed platen and a movable platen, a source of hydraulic fluid under pressure, a fluid pressure operated motor connected to said movable platen for moving the same, a valve having two relatively movable elements for controlling the flow of fluid from said source to said motor, a secondary fluid motor, a secondary valve for metering the flow of fluid from said source to said secondary motor, a cam adapted to be moved by said secondary motor and one of said valve elements adapted to be moved directly by said cam, variable motion transmitting means interconnecting the other of the said valve elements and the said cam, the said means comprising a mechanism having a fixed pivot and a secondary pivot movable toward and away from said fixed pivot to form a variable fulcrum with respect to the mechanism and the said valve element, the arrangement being such that the said movable platen follows a predetermined position-speed relationship during the flashing period of said cycle.

7. Hydraulic control apparatus for a flash welder having a normally fixed platen and a movable platen operated by a fluid pressure motor, said apparatus acting to impart desirable movement to said movable platen and comprising in combination a source of hydraulic fluid under pressure, a valve for controlling the flow of fluid from said source to said motor, said valve having two relatively movable control elements, a servomotor, an arcuate cam pivotally mounted on said valve for rotation about its pivot, an arm interconnecting said cam and said servomotor so that the cam will be rotated thereby, said cam being in engagement with one of said valve control elements, mechanism connected to the other of said valve control elements including a fixed pivot and a secondary pivot movable toward and away from said fixed pivot to form a variable fulcrum, said mechanism engaging said cam so that movement of said cam will result in a predetermined position speed relationship of said control elements of said valve, a secondary valve in communication with said fluid pressure source and with said valve means, said valve control elements responsive in opening movement to the opening of said secondary valve to add a quick upsetting movement to the flashing cycle of said movable platen.

8. Apparatus according to claim 1 and further including valve control mechanism on said movable platen, said secondary valve responsive in operation to said valve control mechanism whereby the said upset movement imparted to the said movable platen occurs by reason of predetermined movement of the said platen.

KINGSLEY A. DOUTT.

References Cited in the file of this patent

UNITED STATES PATENTS

| Number | Name | Date |
| --- | --- | --- |
| 718,973 | Du Bois | Jan. 27, 1903 |
| 939,792 | Blumel | Nov. 9, 1909 |
| 1,231,257 | Herr | June 26, 1917 |
| 1,892,208 | Ferris | Dec. 27, 1932 |
| 2,187,452 | Gordon | Jan. 16, 1940 |
| 2,241,807 | Cotner | May 13, 1941 |
| 2,274,224 | Vickers | Feb. 24, 1942 |
| 2,373,226 | Coates | Apr. 10, 1945 |
| 2,455,526 | Sciaky | Dec. 7, 1948 |
| 2,516,449 | Coates | July 25, 1950 |

FOREIGN PATENTS

| Number | Country | Date |
| --- | --- | --- |
| 27,326 | Great Britain | of 1909 |